United States Patent [19]

Stephen et al.

[11] Patent Number: 4,534,503

[45] Date of Patent: Aug. 13, 1985

[54] STIFFENED PANEL

[75] Inventors: David Stephen; Martin H. Mansbridge; Alan W. Highnam, all of Bristol, England

[73] Assignee: British Aerospace Public Limited Company, London, England

[21] Appl. No.: 550,213

[22] Filed: Nov. 9, 1983

[30] Foreign Application Priority Data

Nov. 9, 1982 [GB] United Kingdom ............... 8231913

[51] Int. Cl.³ ..................... B23K 28/02; B21D 26/02
[52] U.S. Cl. .................................. 228/157; 228/193
[58] Field of Search ..................... 228/118, 157, 193

[56] References Cited

U.S. PATENT DOCUMENTS 4,304,821 12/1981 Hayase et al. ................. 228/157
4,351,470 9/1982 Swadling et al. .............. 228/157

OTHER PUBLICATIONS

A Significant Advance in Aerospace Technology, *Superplastic Forming/Diffusion Bonding,* Rev. 8-78, NA-77-902, Rockwell International.

Primary Examiner—Kenneth J. Ramsey
Assistant Examiner—M. Jordan
Attorney, Agent, or Firm—Cushman, Darby & Cushman

[57] ABSTRACT

A stiffened panel of the type formed by a method including subjecting two metal sheets, both capable of superplastic deformation and diffusion bonding, which are positioned face to face, to a bending and deforming process during which the sheets are joined to one another at a series of spaced substantially continuous joint lines across their faces, and during which parts of said sheets between the joint lines are superplastically deformed in a mould to form a series of cavities between the two sheets, portions of said sheets on respective sides of a joint line being moved to form sidewalls of two neighboring cavities, these sidewalls being urged to lie adjacent one another over substantial parts of their areas, so that they become diffusion bonded one to another to form a common sidewall of neighboring cavities, and having formed spaced-apart regions where the sheets have contacted opposite mould faces is further formed with an outer lip region in which an edged region of one sheet remains generally aligned with that spaced-apart region which it forms, while an edge region of the other sheet is deformed out of alignment with that spaced-apart region which it forms to lie, firstly, generally transverse to the spaced-apart regions and, secondly, to be generally aligned with, and be attached to, said region of said one sheet.

1 Claim, 2 Drawing Figures

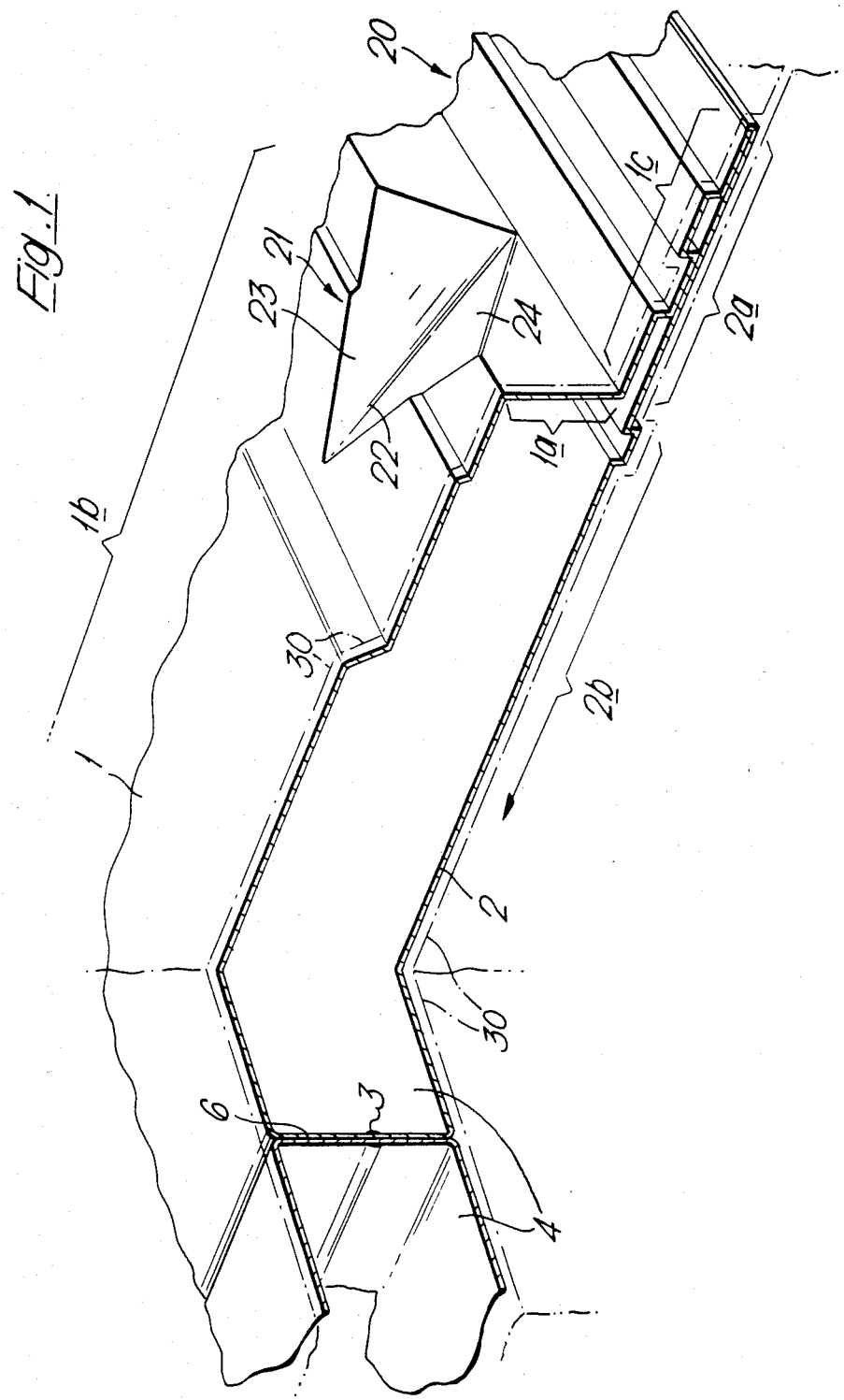

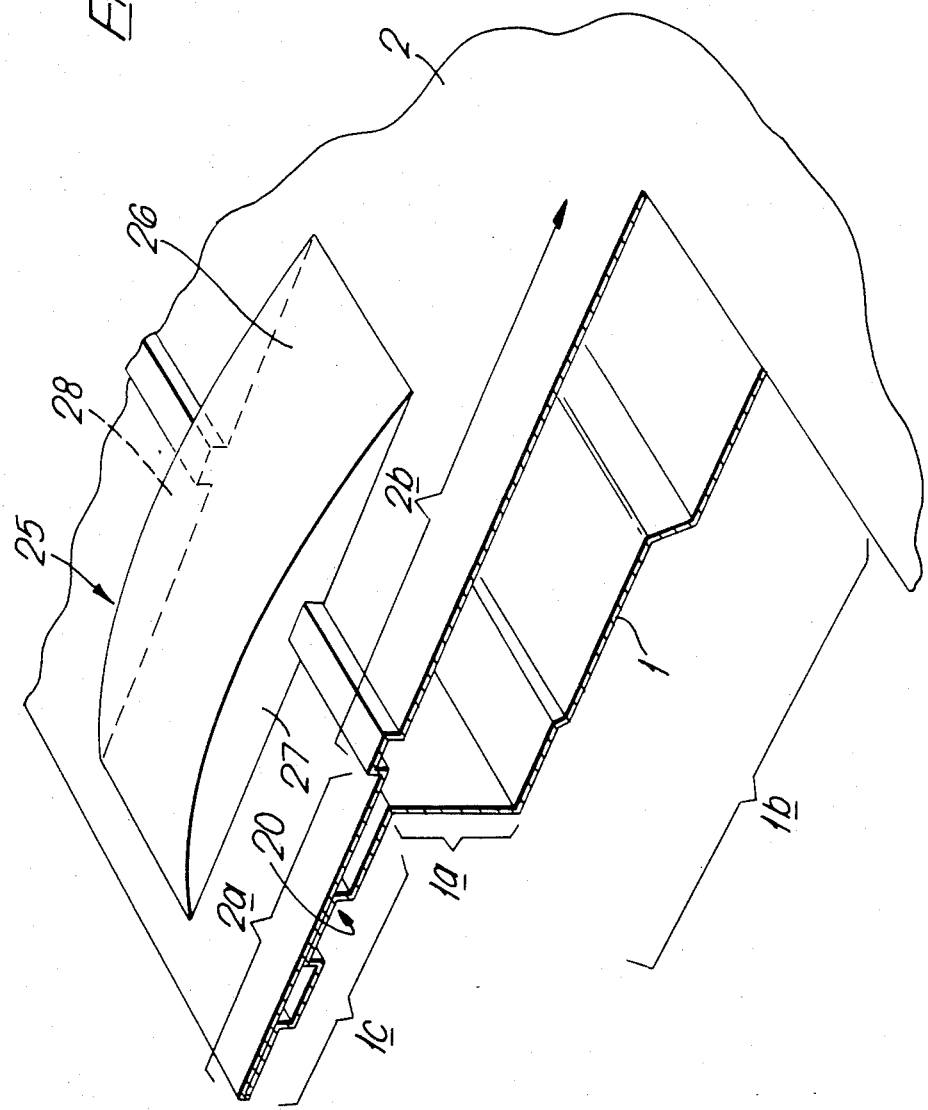

STIFFENED PANEL

This invention relates to stiffened panels of the type formed by a method including subjecting two metal sheets, both capable of superplastic deformation and diffusion bonding, which are positioned face to face, to a bending and deforming process during which the sheets are joined (for example by a welding or other joining process) to one another at a series of spaced substantially continuous joint lines across their faces, and during which parts of said sheets between the joint lines are superplastically deformed in a mould to form a series of cavities between the two sheets, portions of said sheets on respective sides of a joint line being moved to form sidewalls of two neighbouring cavities, these sidewalls being urged to lie adjacent one another over substantial parts of their areas, so that they become diffusion bonded one to another to form a common sidewall of neighbouring cavities.

Such a method, and stiffened panels formed thereby, is disclosed in British Patent No. 2,030,480 and U.S. Pat. No. 4,351,470.

Whilst this method provides a relatively efficient structure for the panel, when a panel made by the above process is designed for a specific purpose, then certain improvements become desirable.

SUMMARY OF THE INVENTION

The invention has for an objective the provision of such improvements in a panel formed by the above stated method.

According to one aspect of the present invention, a stiffened panel of the type formed by the above stated method using two superplastically deformable sheets having formed spaced-apart regions where the sheets have contacted opposite mould faces is further formed with an outer lip region in which an edged region of one sheet remains generally aligned with that spaced-apart region which it forms, whilst an edge region of the other sheet is deformed out of alignment with that spaced-apart region which it forms to lie, firstly, generally transverse to the spaced-apart regions, and secondly, to be generally aligned with, and be attached to, said edge region of said one sheet.

Preferably, the generally transverse deformed region is formed with inset generally V-shaped regions, the sides and the base of each V-shape being formed from the spaced-apart region and the deformed region of said other sheet and sloping towards the spaced-apart region of said one sheet.

Additionally, or alternatively, the lip region is stiffened by spaced bridging formations extending from that spaced-apart region of said one sheet to an edge region thereof, the bridging formation preferably, when viewed from the side, being of segmental shape.

BRIEF DESCRIPTION OF THE DRAWINGS

One embodiment of a panel according to the invention is described by way of example with reference to the accompanying drawings in which FIG. 1 is a diagrammatic partly sectioned view of a stiffened panel viewed from one side, and FIG. 2 is a diagrammatic partly sectioned view of the stiffened panel viewed from the other side.

DESCRIPTION OF THE PREFERRED EMBODIMENTS

A stiffened panel is formed from sheets 1 and 2. Both sheets have superplastic characteristics and are capable of being diffusion bonded. They are attached to one another by forming continuous, air-tight welds around the edges of the sheets and along several other lines 3 forming enclosed neighbouring inflatable envelopes 4, the two sheets being clamped between the upper and lower members (not shown) respectively of a forming mould into which superplastic deformation is to take place. The welding is preferably but not necessarily electron beam welding.

The forming mould and the two sheets 1 and 2, are heated to within a temperature range at which the sheets 1 and 2 exhibit superplastic characteristics. An inert gas is admitted under pressure into the envelopes 4 via inlet tubes (not shown). This gradually causes the envelopes 4 to expand in balloon-like fashion, the envelopes thus becoming cavities. Expansion in this form continues until the metal sheets contact the upper and lower members of the forming mould when the expanding metal, in the region of contact, takes on the flattened shape of the upper and lower mould members, the overall shape of each cavity becoming sausage-like in transverse cross-section. As pressurised gas is continued to be admitted, the flattened surfaces of the sausage-shape grow to form a generally rectangular shape when neighbouring regions of the cavities forming the walls meet and diffusion bonding occurs, the regions of diffusion bonding being referenced 6.

The mould is formed also to provide a peripheral lip region 20 by causing that region 2(a) of the sheet 2 to be maintained generally in the same plane as that region 2(b) of contact (i.e. that taking on the flattened shape of the lower mould member) and by causing that region 1(a) of the sheet to be deformed to lie generally transverse to the region 1(b) of contact (i.e. that taking on the flattened shape of the upper mould member) and to that region 2(b), and by causing a region 1(c) to be generally aligned with the region 2(a) and be attached to it by, preferably, diffusion bonding.

Referring specifically to FIG. 1, to improve the structural characteristics of the panel so formed, the sheet 1 is formed, by shaping the mould, with inset spaced v-shaped regions 21 in the transverse region 1(a) and the region 1(b), the base 22 of each V-shape and the sides 23, 24 thereof sloping towards the region 1(b).

Referring specifically to FIG. 2, to further improve the structural chracteristics of the formed panel, the sheet 2 is formed, again by shaping the mould, with spaced bridging formations 25 extending from that region referenced 2(b) to that region referenced 2(a). Each bridging region has a surface 26 of part cylindrical form and end faces 27 and 28 which are generally flat. When viewed from the side, each bridging region is thus of segmental shape.

Where feasible, the base 22 of each V-shape is formed coincident with the regions of diffusion bonding 6.

The above described panel is particularly, but not exclusively, suitable for use as an access panel in an aircraft wing surface giving access to fuel tanks formed within the wing.

In FIG. 1, the mould outline, cut away similarly to the finished panel for ease of description, is included for reference purposes at 30. Naturally, the shape of the mould is the inverse of the finished external shape of the panel.

We claim:

1. A stiffened panel of the type formed by a method including subjecting two metal sheets, both capable of superplastic deformation and diffusion bonding, which are positioned face to face, to a bending and deforming process during which the sheets are joined to one another at a series of spaced substantially continous joint lines across their faces, and during which parts of said sheets between the joint lines are superplastically deformed in a mould to form a series of cavities between the two sheets, portions of said sheets on respective sides of a joint line being moved to form sidewalls of two neighbouring cavities, these sidewalls being urged to lie adjacent one another over substantial parts of their areas, so that they become diffusion bonded one to another to form a common sidewall of neighbouring cavities, and having formed spaced apart regions where the sheets have contacted opposite mould faces is further formed with an outer lip region in which an edge region of one sheet remains generally aligned with that spaced apart region which it forms, whilst an edge region of the other sheet is deformed out of alignment with that spaced apart region which it forms to lie, firstly, generally transverse to the spaced-apart regions and, secondly, to be generally aligned with, and be attached to, said edge region of said one sheet, said generally transverse deformed region being further formed with inset generally V-shaped regions, the sides and the base of each V-shape being formed from the spaced-apart region and the deformed region of said other sheet and sloping toward the spaced-apart region of said one sheet, said base of at least some of said V-shaped regions being coincident with at least some of said common side walls, and said lip region being stiffened by spaced bridging formations extending from that spaced-apart region of said one sheet to an edge region therof, the bridging formation, when viewed from the side, being of generally segmental shape.

* * * * *